(12) United States Patent
Streit et al.

(10) Patent No.: US 7,641,291 B2
(45) Date of Patent: Jan. 5, 2010

(54) METHOD AND APPARATUS FOR DEACTIVATING A HILLHOLDER FUNCTION

(75) Inventors: Andreas Streit, Schwieberdingen (DE); Toni Braeuer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 10/557,212

(22) PCT Filed: May 8, 2004

(86) PCT No.: PCT/DE2004/000965

§ 371 (c)(1),
(2), (4) Date: Oct. 31, 2006

(87) PCT Pub. No.: WO2004/103785

PCT Pub. Date: Dec. 2, 2004

(65) Prior Publication Data

US 2007/0164608 A1    Jul. 19, 2007

(30) Foreign Application Priority Data

May 16, 2003   (DE) ............................... 103 22 125

(51) Int. Cl.
*B60T 8/1755* (2006.01)
(52) U.S. Cl. ........................................... 303/191
(58) Field of Classification Search ............... 303/191, 303/192, 146, 157
See application file for complete search history.

(56) References Cited

U.S. PATENT DOCUMENTS

| | | | | |
|---|---|---|---|---|
| 6,428,120 B1 * | 8/2002 | Holl | ............ | 303/191 |
| 6,497,298 B2 * | 12/2002 | Irie et al. | ............ | 180/197 |
| 6,994,407 B2 * | 2/2006 | Kinder et al. | ............ | 303/191 |
| 7,031,818 B2 * | 4/2006 | Endres | ............ | 701/70 |
| 2003/0214185 A1 * | 11/2003 | Kinder et al. | ............ | 303/192 |
| 2006/0170284 A1 * | 8/2006 | Alvarez et al. | ............ | 303/191 |

FOREIGN PATENT DOCUMENTS

| | | |
|---|---|---|
| DE | 199 50 028 | 4/2001 |
| DE | 199 50 034 | 4/2001 |
| DE | 100 09 504 | 8/2001 |
| DE | 100 58 071 | 6/2002 |
| DE | 100 63 062 | 6/2002 |
| WO | WO 2004/056632 | 7/2004 |

* cited by examiner

*Primary Examiner*—Thomas J Williams
(74) *Attorney, Agent, or Firm*—Kenyon & Kenyon LLP

(57) ABSTRACT

A method for controlling the braking system of a motor vehicle
in which, in order to prevent the vehicle from rolling away after a stopping action, a first braking force value is established at at least one wheel of the vehicle, independently of the driver, and is held for a predefined limited holding time;
a transverse variable characterizing a transverse motion of the vehicle is ascertained; and
as a function of the transverse variable, a release of the braking force is accomplished even before the predefined holding time has elapsed.

15 Claims, 2 Drawing Sheets

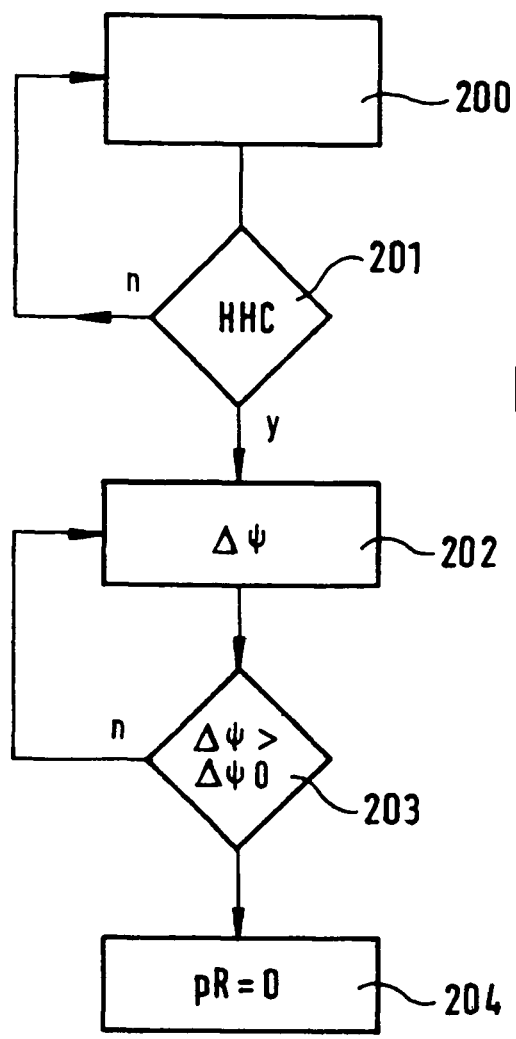
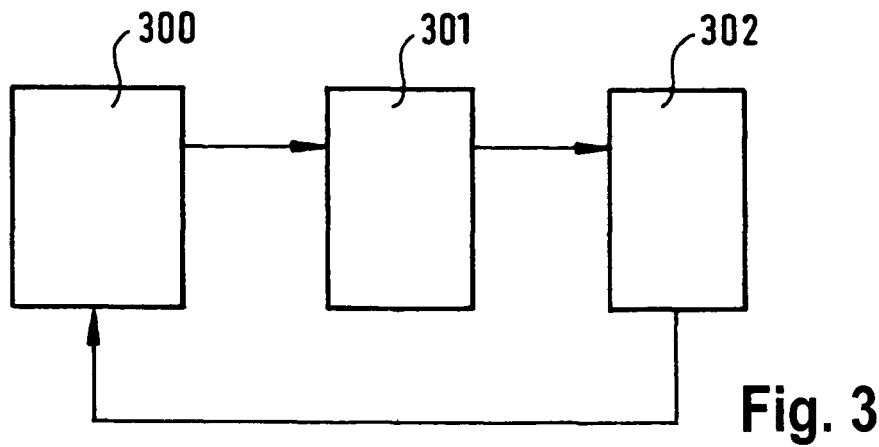
Fig. 2
Fig. 3

METHOD AND APPARATUS FOR DEACTIVATING A HILLHOLDER FUNCTION

FIELD OF THE INVENTION

The present invention relates to a method and an apparatus for deactivating a hillholder function in a motor vehicle.

BACKGROUND INFORMATION

German Patent Application No. DE 199 50 034 describes a method and an apparatus for controlling a braking system in which in at least one operating state, when the brake pedal is actuated, braking force is held at at least one wheel of the vehicle regardless of the extent of pedal actuation. Various conditions are provided in this context, together or alternatively, for activation or deactivation of the function.

German Patent Application No. DE 199 50 028 describes a method and an apparatus for controlling a vehicle in which, at least when the vehicle is at a standstill, braking force is held at at least one wheel of the vehicle regardless of the extent of pedal actuation. When a shutoff condition exists, the braking force is released, whereas when slippage of the vehicle is detected, braking force is released independently of that condition. Features for detecting slippage of the vehicle, and a risk of slippage, are furthermore presented.

SUMMARY OF THE INVENTION

The present invention relates to a method for controlling the braking system of a motor vehicle
in which, in order to prevent the vehicle from rolling away after a stopping action, a first braking force value is established at at least one wheel of the vehicle, independently of the driver, and is held for a predefined limited holding time, or is held in general until a release condition exists.

This refers, in particular, to a so-called "hillholder." An essence of the present invention is that
a transverse variable characterizing a transverse motion of the vehicle is ascertained; and
as a function of the transverse variable, a release of the braking force is accomplished even before the predefined holding time has elapsed.

As a result, the hillholder can be deactivated upon detection of a rotational motion of the vehicle. An improvement in safety for the vehicle and its occupants is thereby achieved.

An advantageous embodiment of the present invention is characterized in that the release condition is the expiration of a holding time interval of predefined length. The beginning of the holding time interval is characterized by initiation of the hillholder.

An advantageous embodiment of the present invention is characterized in that the yaw rate is incorporated into the ascertaining of the transverse variable. The yaw rate is a particularly clear indication of a rotational motion of the vehicle.

Also usable for this, however, is the transverse acceleration, ascertained, e.g., by a transverse acceleration sensor.

An advantageous embodiment of the present invention is therefore also characterized in that a release of the braking force is accomplished, even before the predefined holding time has elapsed, if the yaw rate or the transverse acceleration or a variable correlated with them exceeds a predefined limit value.

An advantageous embodiment of the present invention is characterized in that
after the holding action has been achieved, the value of the yaw rate is ascertained and stored; and
a release of the braking force is accomplished, even before the predefined holding time has elapsed, if the absolute value of the difference between the instantaneously ascertained yaw rate and the stored yaw rate exceeds a predefined limit value.

It is thereby possible, in particular, to prevent erroneous deactivation of the hillholder because of a possible offset value of the yaw rate signal.

An advantageous embodiment of the present invention is characterized in that
a slipping action of the motor vehicle is detected as a function of the transverse variable; and
the event a slipping action is detected, a release of the braking force is accomplished even before the predefined holding time has elapsed.

The apparatus for controlling the braking system of a motor vehicle contains
rollaway prevention means with which, in order to prevent the vehicle from rolling away after a stopping action, a first braking force value is established at at least one wheel of the vehicle, independently of the driver, and is held for a predefined limited holding time.

The apparatus furthermore contains
ascertaining means which ascertain a transverse variable characterizing a transverse motion of the vehicle; and
braking force release means with which, as a function of the transverse variable, a release of the braking force is accomplished even before the predefined holding time has elapsed.

An advantageous embodiment of the present invention is characterized in that
the ascertaining means are a sensor or a sensor system for ascertaining the yaw rate; and
the transverse variable is the yaw rate.

An advantageous embodiment of the present invention is characterized in that the ascertaining means are a yaw rate sensor.

An advantageous embodiment of the present invention is characterized in that the braking force release means are configured so that a release of the braking force is accomplished, even before the predefined holding time has elapsed, if the yaw rate exceeds a predefined limit value.

An advantageous embodiment of the present invention is characterized in that
storage means are present in which a value of the yaw rate, ascertained after the holding action has been achieved, is stored; and
the braking force release means are configured so that a release of the braking force is accomplished, even before the predefined holding time has elapsed, if the absolute value of the difference between the instantaneously ascertained yaw rate and the yaw rate stored in the storage means exceeds a predefined limit value.

The advantageous embodiments of the method according to the present invention are also expressed as advantageous embodiments of the apparatus according to the present invention, and vice versa.

BRIEF DESCRIPTION OF THE DRAWINGS

FIG. 2 shows the sequence of the method according to the present invention with reference to a flow chart.

FIG. 3 shows the configuration of the apparatus according to the present invention.

DETAILED DESCRIPTION

When the driver of a motor vehicle brakes to a stop on an incline in the longitudinal direction of the vehicle and then releases the brake, a hillholder function then immobilizes all the wheels during a time interval of definable length (brake pressure is "locked in"). If the vehicle is on an incline having a low coefficient of friction (e.g. an icy road surface), slippage of the vehicle can then occur and the vehicle slides backward with four locked wheels. The driver has no ability to steer the vehicle during this time, since no force can be transferred via the wheels. An advantage of the present invention is to detect a rotation of the vehicle and thus an uncontrolled slippage, and to terminate the hillholder function.

A rotation of the vehicle, and therefore an uncontrolled slippage, is therefore detected In the context of the present invention. As a consequence of detection of a rotation, the hillholder function is terminated. The wheels are then once again free to move, and the driver can perform a directional correction and bring the vehicle back under control.

A determination is made, via evaluatable signals, as to whether a rotation of the vehicle is taking place while a hillholder function is active. This is done by investigating, by way of an evaluation of signals that sense a transverse component of the vehicle motion, whether a rotational motion of the vehicle is present.

The profile of the output signals of the rotation rate sensor or yaw rate sensor is of particular interest in this context, but the output signal of, for example, the transverse acceleration sensor can also be considered.

Figure 1:
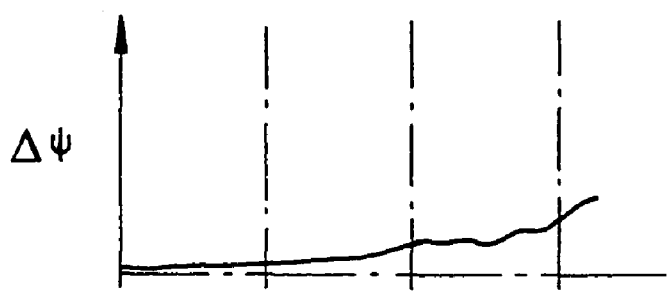
FIG. 1 shows the sequence of the method according to the present invention with reference to sensor signals.
Figure 1:
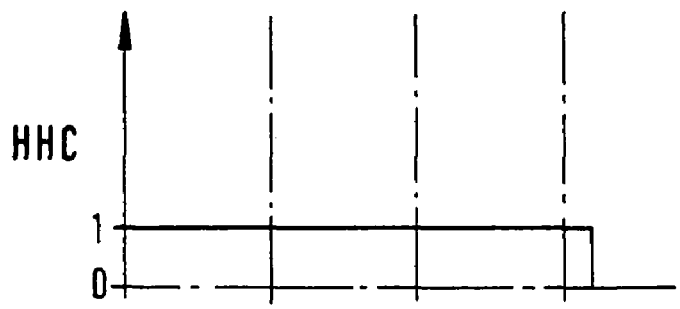
Figure 1:
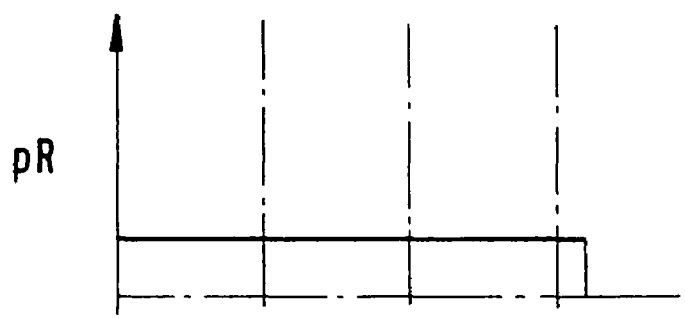
Figure 1:
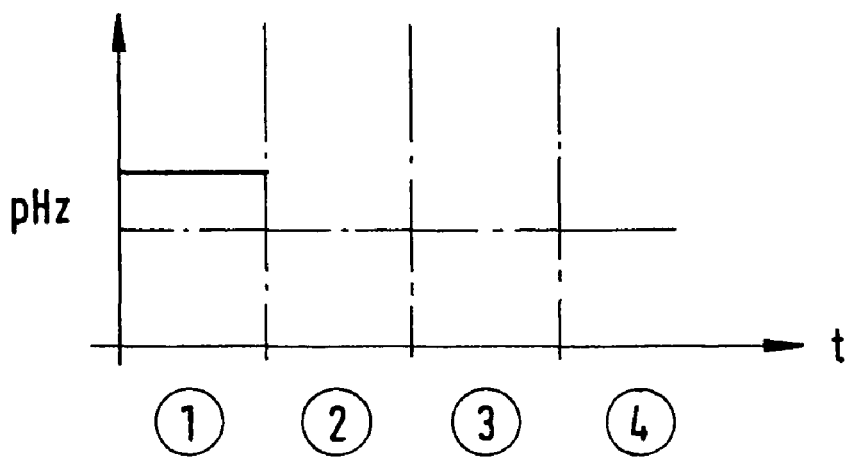

Typical changes over time in sensor signals and other variables during execution of the method according to the present invention are depicted in FIG. 1. The time t is plotted on the abscissa in each case; plotted on the ordinate are

- in the topmost diagram, the change (labeled $\Delta\psi$) in the yaw rate;
- in the second diagram from the top, the hillholder status (labeled HHC), where HHC=1 indicates an activated hillholder and HHC=0 a non-activated hillholder;
- in the third diagram from the top, the pressure pR in a wheel brake cylinder; and
- in the bottommost diagram, the pressure pHz in the main brake cylinder.

Four time intervals labeled 1, 2, 3, and 4 are indicated along the time axis t drawn at the very bottom.

Time Interval 1:

The vehicle comes to a stop on an incline. The driver actuates the brake pedal (pHz>0) and the hillholder is activated (HHC=1). The output signal $\psi$ of the yaw rate sensor is stored. By comparing the stored yaw rate to the present yaw rate, its change $\Delta\psi$ is ascertained. $\Delta\psi$ is approximately zero.

Time Interval 2:

The driver releases the brake pedal (pHz drops to zero). The hillholder remains activated, however (HHC=1) to prevent the vehicle from rolling away.

Time Interval 3:

$\Delta\psi$ increases slightly, but does not yet exceed a limit value.

Time Interval 4:

The value of $\Delta\psi$ exceeds a limit value, i.e. a rotational motion of the vehicle that can be attributed only to a slipping action is detected. As a consequence thereof, the hillholder is deactivated (HHC=0), and the pressure pR in the wheel brake cylinder (or in all the wheel brake cylinders) is released.

The sequence of the method according to the present invention is depicted in FIG. 2. Block 200 indicates the beginning of the method. Block 201 (HHC) then checks whether the activation conditions for the hillholder are met (e.g. inclined road surface and vehicle at a standstill). If the result is No (labeled "n" in FIG. 2), execution then branches back to the beginning of the method. If the result is Yes, however (labeled "y" in FIG. 2), the variable $\Delta\psi$ is then ascertained in block 202. Block 203 then queries whether $\Delta\psi$ exceeds a limit value $\Delta\psi 0$, i.e. whether $\Delta\psi > \Delta\psi 0$. If the response is No, the variable $\Delta\psi$ is ascertained again in block 202. If the response is Yes, then in block 204 the brake pressure pR in the wheel brake cylinders is prematurely deactivated.

The configuration of the apparatus according to the present invention is depicted in FIG. 3. Block 300 contains the rollaway prevention means, which in turn control ascertaining means 301. As a function of the result of the ascertaining means, braking force release means 302 are controlled and in turn prematurely deactivate rollaway prevention means 300.

What is claimed is:

1. A method for controlling a braking system of a motor vehicle, the method comprising:

in order to prevent the vehicle from rolling away after a stopping action, establishing a first braking force value at at least one wheel of the vehicle, independently of a driver, and holding the first braking force value until a release condition exists;

after the holding has been achieved, ascertaining and storing a value of a yaw rate;

ascertaining a transverse variable characterizing a transverse motion of the vehicle; and as a function of the transverse variable, providing a release of a braking force even before the release condition exists;

wherein:
the yaw rate is incorporated into the ascertaining of the transverse variable;
the release condition is an expiration of a holding time interval of predefined length;
the release of the braking force even before the release condition exists is accomplished if an absolute value of a difference between an instantaneously ascertained yaw rate and the stored yaw rate exceeds a predefined limit value.

2. The method according to claim 1, wherein the exceedance of the predefined limit value by the absolute value indicates a slipping action of the motor vehicle.

3. An apparatus for controlling a braking system of a motor vehicle, comprising:

rollaway prevention means for preventing the vehicle from rolling away after a stopping action, in that a first braking force value is established at at least one wheel of the vehicle, independently of a driver, and is held until a release condition exists;

ascertaining means for ascertaining, after the holding of the first braking force is achieved, a value of a yaw rate characterizing a transverse motion of the vehicle;

storage means for storing the ascertained yaw rate value; and braking force release means configured to provide a release of the braking force even before the release condition exists, if an absolute value of a difference between an instantaneously ascertained yaw rate value and the yaw rate value stored in the storage means exceeds a predefined limit value;

wherein:
the release condition is an expiration of a holding time interval of predefined length; and
the ascertaining means includes at least one of a sensor and a sensor system for ascertaining the yaw rate value.

4. A method for controlling a braking system of a motor vehicle, the method comprising:
after a stopping action, establishing a first braking force value at at least one wheel of the vehicle, independently of a driver;
after the establishing of the first braking force has been achieved, ascertaining and storing a value of a yaw rate;
ascertaining an absolute value of a difference between an instantaneously ascertained yaw rate value and the stored yaw rate value; and
providing a release of a braking force responsive to a determination that the absolute value exceeds a predefined limit value.

5. The method according to claim 4, wherein the establishment of the first braking force value at the at least one wheel prevents the vehicle from rolling after the stopping action.

6. The method according to claim 4, wherein the absolute value characterizes a transverse motion of the vehicle.

7. The method according to claim 4, wherein the exceedance of the predefined limit value by the absolute value indicates a slipping action of the motor vehicle.

8. A method for controlling a braking system of a motor vehicle, the method comprising:
after a stopping action, establishing a first braking force value at at least one wheel of the vehicle, independently of a driver;
after the establishing of the first braking force has been achieved, ascertaining and storing a value of a yaw rate;
ascertaining an absolute value of a difference between an instantaneously ascertained yaw rate value and the stored yaw rate value; and
providing a release of a braking force:
upon a determination that the absolute value exceeds a predefined limit value; and
otherwise upon existence of another predetermined release condition;
wherein the ascertaining of the absolute difference is repeatedly performed until an earlier of (a) the determination that the absolute value exceeds the predefined limit value and (b) the existence of the release condition.

9. The method according to claim 8, wherein the release condition is an expiration of a holding time interval of predefined length.

10. An apparatus for controlling a braking system of a motor vehicle, comprising:
rollaway prevention means for, after a stopping action, establishing a braking force value at least one wheel of the vehicle, independently of a driver;
ascertaining means for ascertaining, after the holding of the first braking force is achieved, a value of a yaw rate;
storage means for storing the ascertained yaw rate value; and
braking force release means:
is configured to release the braking force even before the release condition exists, in an instance where an absolute value of a difference between an instantaneously ascertained yaw rate value and the yaw rate value stored in the storage means exceeds a predefined limit value; and
is further configured to release the braking force after an expiration of a holding time interval of predefined length in an instance where the absolute value of the difference between the instantaneously ascertained yaw rate value and the yaw rate value stored in the storage means does not exceed the predefined limit value.

11. The apparatus according to claim 10, wherein the ascertaining means includes at least one of a sensor and a sensor system for ascertaining the yaw rate value.

12. The apparatus according to claim 11, wherein the ascertaining means includes a yaw rate sensor.

13. An apparatus for controlling a braking system of a motor vehicle, comprising:
rollaway prevention means for, after a stopping action, establishing a braking force value at at least one wheel of the vehicle, independently of a driver;
ascertaining means for ascertaining, after the holding of the first braking force is achieved, a value of a yaw rate;
storage means for storing the ascertained yaw rate value; and
braking force release means configured to:
release the braking force even before the release condition exists, if an absolute value of a difference between an instantaneously ascertained yaw rate value and the yaw rate value stored in the storage means exceeds a predefined limit value; and
otherwise release the braking force after an expiration of a holding time interval of predefined length;
wherein the absolute value characterizes a transverse motion of the vehicle.

14. An apparatus for controlling a braking system of a motor vehicle, comprising:
rollaway prevention means for, after a stopping action, establishing a braking force value at at least one wheel of the vehicle, independently of a driver;
ascertaining means for ascertaining, after the holding of the first braking force is achieved, a value of a yaw rate;
storage means for storing the ascertained yaw rate value; and
braking force release means configured to:
release the braking force even before the release condition exists, if an absolute value of a difference between an instantaneously ascertained yaw rate value and the yaw rate value stored in the storage means exceeds a predefined limit value; and
otherwise release the braking force after an expiration of a holding time interval of predefined length;
wherein the exceedance of the predefined limit value by the absolute value indicates a slipping action of the motor vehicle.

15. An apparatus for controlling a braking system of a motor vehicle, comprising:
rollaway prevention means for, after a stopping action, establishing a braking force value at at least one wheel of the vehicle, independently of a driver;
ascertaining means for ascertaining, after the holding of the first braking force is achieved, a value of a yaw rate;

storage means for storing the ascertained yaw rate value; and braking force release means configured to:
- release the braking force even before the release condition exists, if an absolute value of a difference between an instantaneously ascertained yaw rate value and the yaw rate value stored in the storage means exceeds a predefined limit value; and
- otherwise release the braking force after an expiration of a holding time interval of predefined length;

wherein the absolute value is repeatedly determined until an earlier of (a) a determination that the absolute value exceeds the predefined limit value and (b) the expiration of the holding time interval.

* * * * *

UNITED STATES PATENT AND TRADEMARK OFFICE
CERTIFICATE OF CORRECTION

PATENT NO. : 7,641,291 B2  Page 1 of 1
APPLICATION NO. : 10/557212
DATED : January 5, 2010
INVENTOR(S) : Streit et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this

Sixteenth Day of November, 2010

David J. Kappos
*Director of the United States Patent and Trademark Office*